July 4, 1939. K. DAVIS Re. 21,136
PROCESS AND MECHANISM FOR DIVIDING INTERMIXED MATERIALS
Original Filed April 15, 1922 5 Sheets-Sheet 1
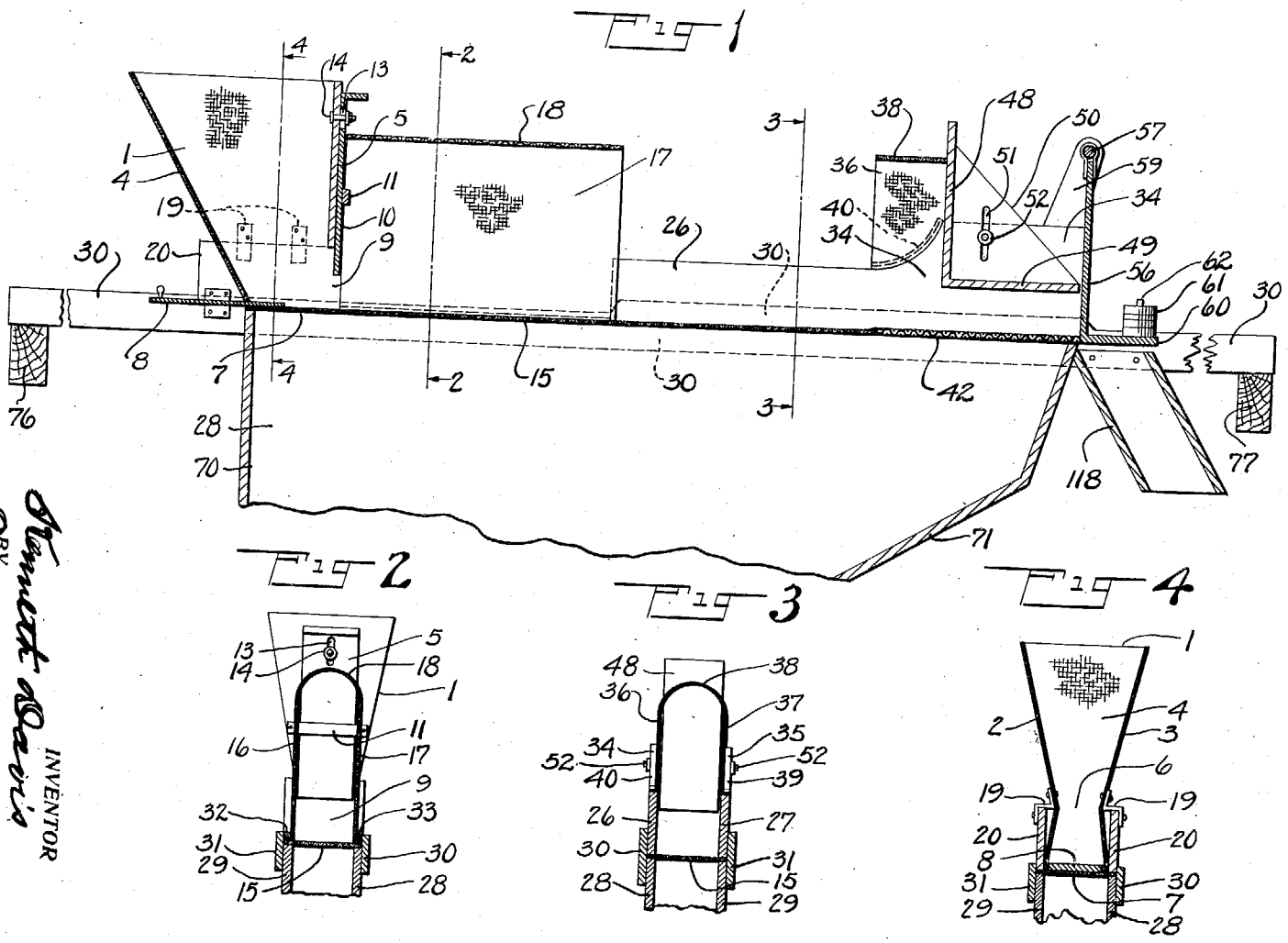
INVENTOR
Kenneth Davis
BY
John D. Morgan
ATTORNEY July 4, 1939. K. DAVIS Re. 21,136
PROCESS AND MECHANISM FOR DIVIDING INTERMIXED MATERIALS
Original Filed April 15, 1922 5 Sheets-Sheet 2
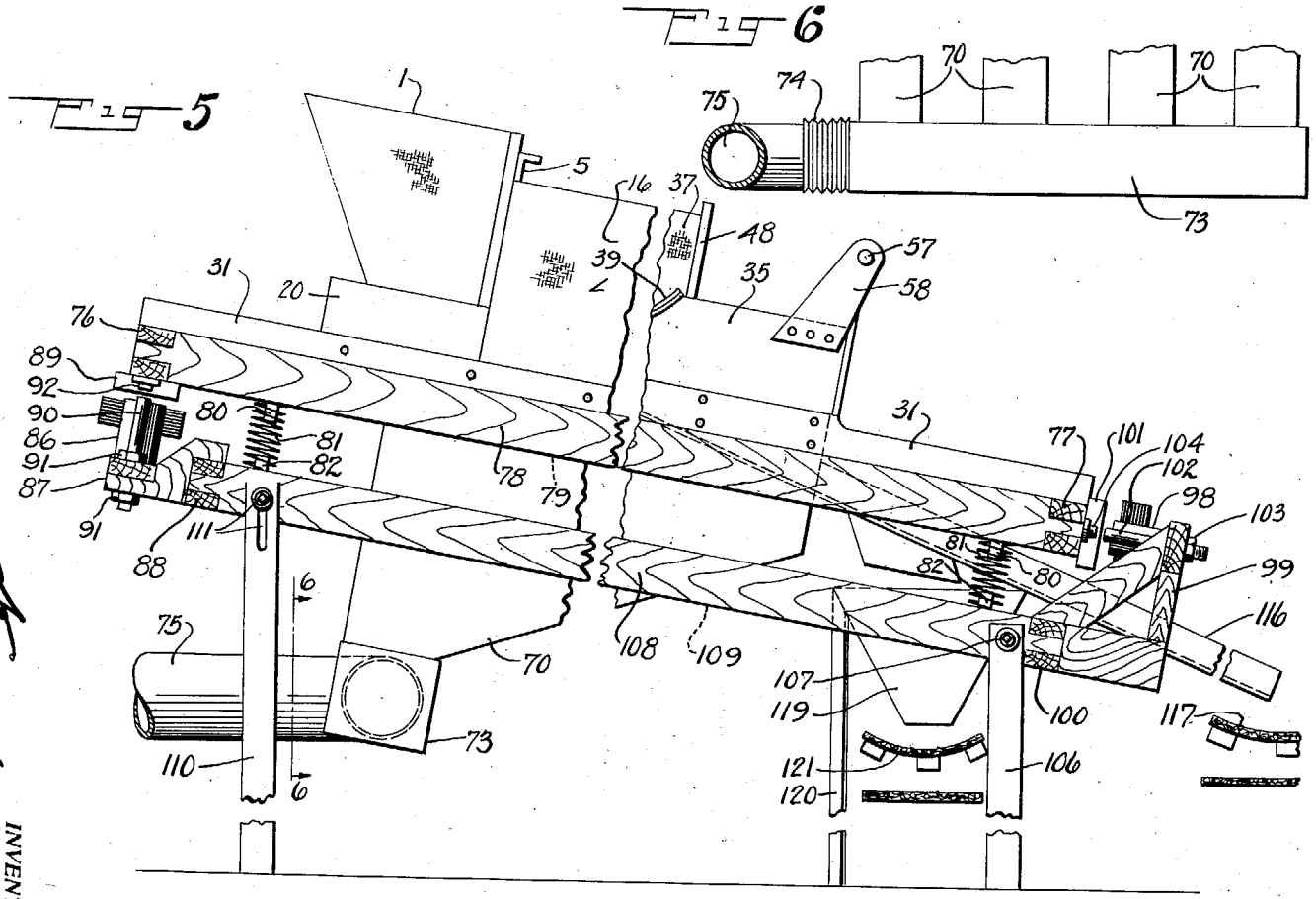
INVENTOR
Kenneth Davis
BY
John D. Morgan
ATTORNEY July 4, 1939. K. DAVIS Re. 21,136
PROCESS AND MECHANISM FOR DIVIDING INTERMIXED MATERIALS
Original Filed April 15, 1922 5 Sheets-Sheet 3
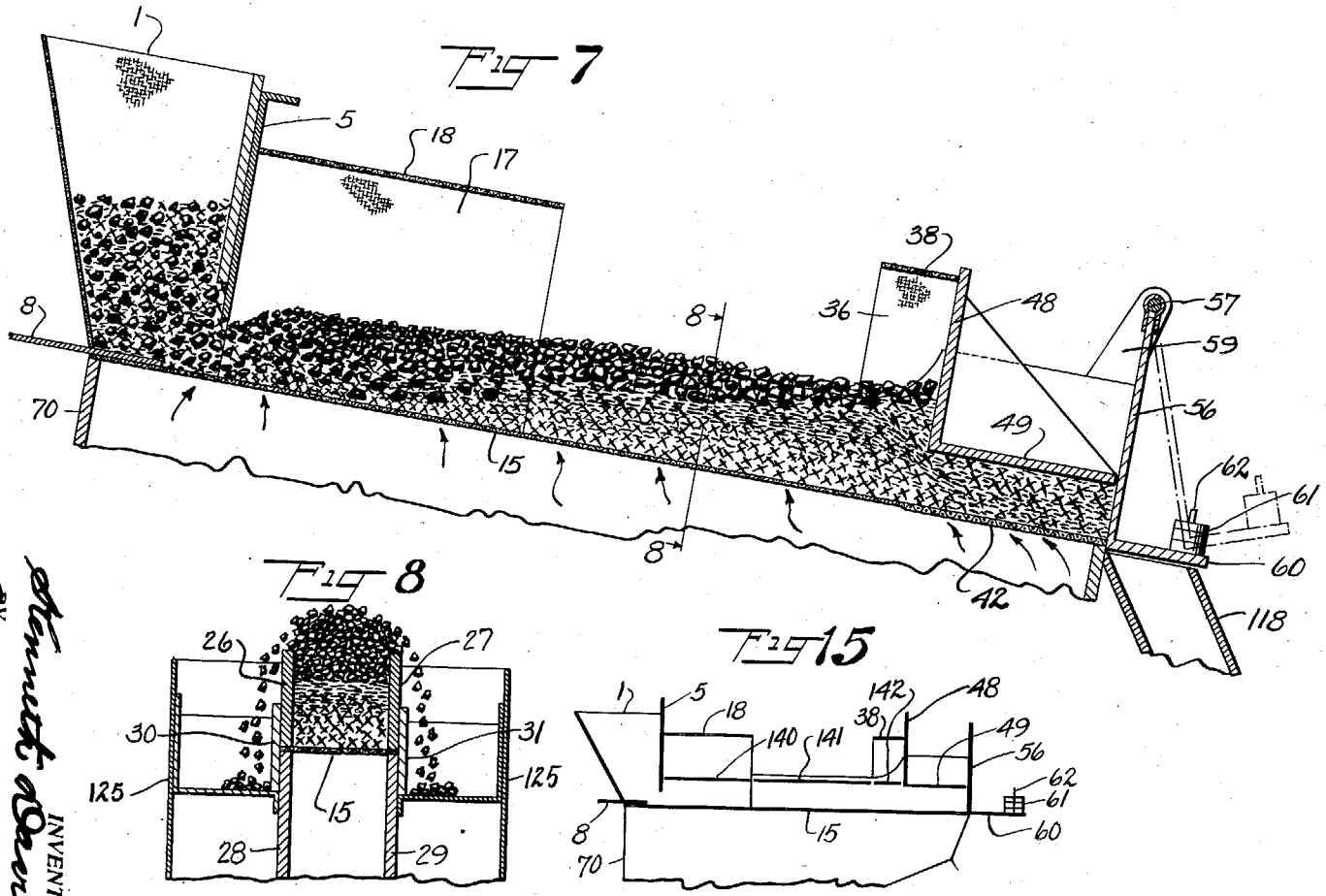
INVENTOR
Kenneth Davis
BY
John D Morgan
ATTORNEY

PROCESS AND MECHANISM FOR DIVIDING INTERMIXED MATERIALS

Original Filed April 15, 1922 5 Sheets-Sheet 4

INVENTOR
Kenneth Davis
BY
John D. Morgan
ATTORNEY

July 4, 1939. K. DAVIS Re. 21,136
PROCESS AND MECHANISM FOR DIVIDING INTERMIXED MATERIALS
Original Filed April 15, 1922 5 Sheets-Sheet 5
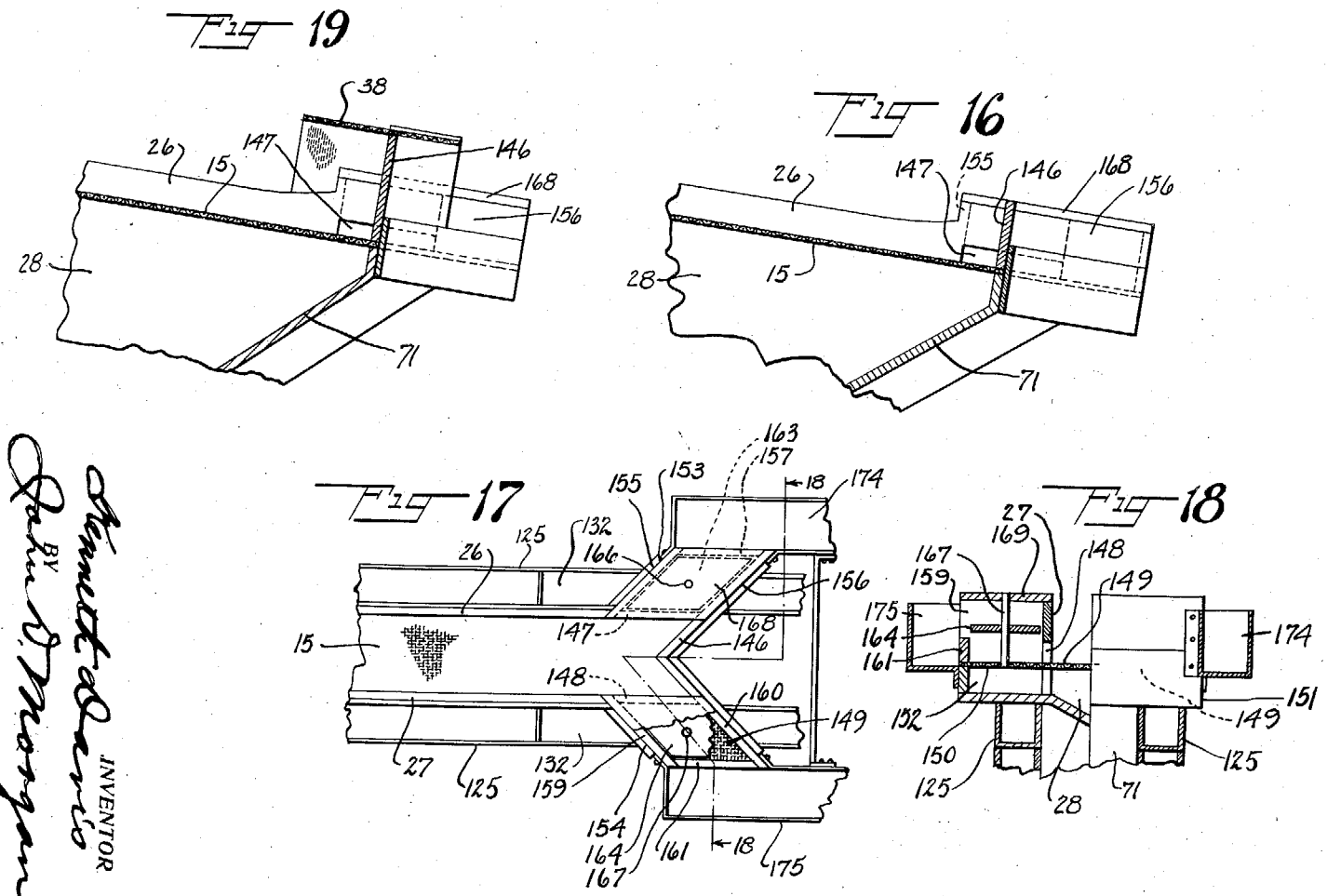
INVENTOR
Kenneth Davis
BY
John D. Morgan
ATTORNEY Reissued July 4, 1939

Re. 21,136

UNITED STATES PATENT OFFICE 21,136

PROCESS AND MECHANISM FOR DIVIDING INTERMIXED MATERIALS

Kenneth Davis, Punxsutawney, Pa., assignor, by mesne assignments, to Richard Peale, Morton F. Locke, and William B. Oakes, trustees Original No. 1,786,738, dated December 30, 1930, Serial No. 553,250, April 15, 1922. Application for reissue August 10, 1938, Serial No. 224,228

24 Claims. (Cl. 209—467)

The invention relates to a novel mechanism and process for separating intermixed, divided materials of different specific gravities, and more especially to a novel mechanism and process wherein air under pressure and vibratory action, together with gravity, are employed; the novel features of the invention being pointed out hereinafter in part and in part being obvious herefrom or to those skilled in the art.

The invention consists in the novel parts, constructions, arrangements, combinations, improvement, steps and processes, herein described.

The accompanying drawings, referred to herein, and constituting a part hereof, illustrate one embodiment of the invention, and together with the description serve to explain the principles thereof.

Of the drawings:

Fig. 1 is a central longitudinal, vertical section, through a separating unit, embodying the invention;

Fig. 2 is a transverse, vertical section taken on the line 2—2 of Fig. 1, looking in the direction of the arrows;

Fig. 3 is a transverse vertical section, taken substantially on the line 3—3 of Fig. 1, looking in the direction of the arrows;

Fig. 4 is also a transverse vertical section taken substantially on the line 4—4 of Fig. 1, looking in the direction of the arrows;

Fig. 5 is a side elevation, with the central part broken away, of a separating unit with its mounting, and its vibrating and air pressure mechanism, and its material conveying devices and is taken looking at Figs. 1 and 7 from the front.

Fig. 6 is a fragmentary view, partly in elevation and partly in section, on the line 6—6 of Fig. 5, showing a part of the air pressure mechanism;

Fig. 7 is a view corresponding to Fig. 1, but showing the separating unit, more or less diagrammatically, in inclined position, and with the intermixed materials in process of separation;

Fig. 8 is a transverse, vertical section, taken substantially on the line 8—8 of Fig. 7, looking in the direction of the arrows, and showing more or less diagrammatically the process of separating the materials;

Fig. 15 is a diagrammatic representation in elevation of a separating unit, showing another modified form thereof;

Fig. 16 is a longitudinal vertical section, similar to Fig. 1 but showing a different construction of the forward end of the separator unit;

Fig. 17 is a fragmentary top plan of the right-hand end of Fig. 1, but showing one part in horizontal section;

Fig. 18 is taken on line 18—18 of Fig. 17, showing one side of the end of the unit in vertical transverse section and the other side in elevation; and Fig. 19 is a fragmentary vertical longitudinal section of a modified form.

Figure 9:
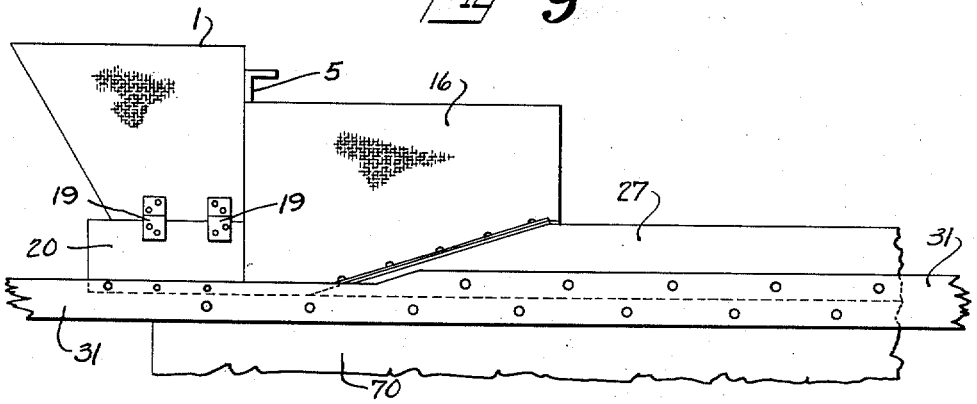
Fig. 9 is a fragmentary elevation corresponding to the upper left-hand part of Figs. 1 and 5, but showing a modified form of the separating unit walls.

The present invention, in certain aspects thereof, is an improvement on the invention of my co-pending application Serial Number 541,123, filed March 4, 1922, Patent No. 1,782,392, dated November 18, 1930. In other aspects thereof, however, the invention is independent of my said co-pending application, and is capable of independent use or of use in separating units differing therefrom in greater or less degree, both in structure and in manner of operation.

The term "divided" as employed herein is conveniently used to signify materials which are in relatively small parts, portions, or particles, such as, broken, or crushed materials, or granular or pulverulent materials, as distinguished from materials in large masses. An example of such materials, and one with which the present invention has proved very successful, is mixed coal and rock or slate, with which is also mixed at times the material known as "bone" or "bony" (a combustible material but having a very high ash content).

It is customary to "size" the coal and other intermixed materials very closely, by screening or otherwise, and to then subject such sized materials to the action of a separating apparatus. This invention is adapted successfully and efficiently to clean or separate the coal from the other intermixed materials through an unusually wide range of intermixed sizes, that is, without the close sizing which is necessary with many, and in fact practically all other, separating machines and processes.

In the present embodied form, an inclined bed of the intermixed divided materials, preferably relatively long and narrow in form and of considerable depth, is subjected to the separating action of a flow of air under pressure. This separating action is preferably aided and expedited by very rapid and short, but forceful vibrations of the bed of materials, the vibratory movement being preferably bi-directional, that is, it is both longitudinal of, and transversely to, the bed of materials in the separating unit. The forward and downward inclination usually imparted to the unit involves gravitational action therewith.

The intermixed materials are rapidly separated and thus are gradually but also very rapidly stratified. The heavy material such as the rock, under the action of the agencies, movements and forces acting thereon, sinks and then flows longitudinally forwardly along the bottom of the bed, and is discharged from the lower forward end thereof. The lighter material, at the same time, under the operation of these agents, forces and movements, seeks and flows along the upper part of the bed, and here is subjected to such of these agencies and influences as will cause the discharge of the clean and separated lighter material, such as the coal, from the top, and preferably over the sides of the unit.

By the present invention, the stratifying and separating action of the air at the rear or entrance of the separating unit is changed from that disclosed in my said copending application, as is also the final back-pressure separating action of the air at the forward or discharging end of the unit. Also the movement and back pressure of the heavier material, such as the rock, is likewise different and is differently controlled from that of my preceding invention, already referred to, together with other novel features which will be first set forth in connection with the following detailed description of the invention.

It will be understood that the foregoing broad and general description, and the following detailed description as well, are exemplary and explanatory, but are not restrictive of the invention; and that the statement of the principles of operation of the invention is correct and adequate as at present advised from observation of, and experimentation with, the invention in practical operation, but that the invention is not necessarily limited thereto or thereby.

Means are provided by the invention for supplying the intermixed divided materials to the cleaning and separating unit automatically at a rate just sufficient for the capacity of the unit, that is, at the highest rate of total and effective separation accomplished by the unit under the particular conditions of operation, such as the physical condition of the intermixed materials, the nature thereof, the size, or variations in size, the relative specific gravities of the intermixed materials, or other conditions.

As embodied, a generally vertically disposed hopper 1 is provided, open at the top, and preferably having some or all of its sides inwardly and downwardly inclined, as shown in Figs. 1 and 4, the walls of the hopper being constructed preferably of foraminate or cribriform material. This allows the air to escape laterally as well as upwardly for removing dust.

The walls, or the side walls 2 and 3 of the hopper converge downwardly toward a throat 6 (Fig. 4), and from this point the walls diverge downwardly to the full width of the separating unit. Thus any tendency toward choking and stopping of the material at the bottom of the hopper is avoided, and the material is always free to flow forward into the separating unit as rapidly as the unit can take care of it. The rear wall 4 of the hopper is shown inclined, while the front wall 5 is shown vertical and wholly or in part solid for purposes to be later described.

The air pressure is preferably utilized for preliminarily driving out the dust from the intermixed materials, as described in my previously filed and co-pending application already referred to, the air for this purpose passing upwardly and backwardly through the part 7 of the air pervious bottom 15, the slide 8 being utilized to regulate and govern this upward flow and pressure of the air for cleaning out dust. Brackets 19 resting on side plate 20 hold the hopper in position, the plates 20 being integral with or resting upon the supporting rails 30 and 31 for the unit (later described).

Means are also provided for regulating the flow or supply of the intermixed materials into the separating unit and, as shown, the size of the open throat or passageway 9 at the bottom and forward end of the hopper is governed or controlled by a vertically movable or adjustable slide 10, moving slidably on the hopper wall 5, and extending the width of the opening 9. This slide is movable within a guiding strip 11, fastened to the hopper wall, and having a slot 13 through which passes a clamping bolt 14, which also passes through the hopper wall, to hold the slide 10 in its adjusted vertical position.

The separating unit is preferably of relatively long and narrow dimensions, and is designed to hold a relatively deep bed of materials, at first intermixed, then gradually but rapidly and completely stratified and thereby separated, discharging the heavy material downwardly and the lighter material from the upper part of the bed; the heavy material being also preferably discharged forwardly and the lighter materials transversely.

Means are provided by the present invention for subjecting the intermixed materials on their entry into the separating unit to such an air pressure and air current action, concomitant with such a control of the material at this time as will insure, not only a rapid and complete stratification or separation of the intermixed material, but will secure these desired results with intermixed materials which are of relatively widely varying sizes, that is, with materials which have not been closely sized in the usual manner.

In the embodiment form of this means, there is provided at the back or entrance end of the separating unit, in conjunction or cooperation with air pressure pervious bottom 15, which may be of closely woven wire mesh, preferably varying in size to suit different sizes of material, a flud pervious hood or closure (Figs. 1 and 2) having sidewalls 16 and 17 abutting on the pervious bottom 15 and extending upwardly therefrom, the sidewalls being integral or continuous and forming an arched top 18, constituting a complete but fluid pervious closure at this end or portion of the separating unit. The solid side walls of the unit are preferably entirely discontinued at this portion of the unit. Also the forward end of the hood is preferably left open.

Thus, the action of the air at this part of the separating unit and the separating process can be directed, controlled and regulated irrespective of maintaining the materials (which are not yet completely stratified and thereby separated) at any particular level of the unit or driving the air in only the vertical direction or through a given depth of material.

It is found in practice, especially with some materials and with some physical conditions of intermixed materials, and particularly where some portions of the intermixed materials are relatively finely divided with respect to others (that is, where the materials vary greatly in size), that to use an air current which will effect a desired rapid stratification and separation of the larger particles of the intermixed materials, will drive the smaller particles of the intermixed materials entirely through the bed of materials. The pervious restraining hood, however, throws these materials back upon the bed and by reason of the partially accomplished stratification and the vibratory movement and the gravitational action, these smaller pieces of material will gradually stratify with the larger portions before leaving, or just after leaving, the forward end of this pervious hooded portion of the unit.

The relative length and other dimensions of the various portions of the unit may be experimentally varied as may be found most efficient with different kinds and conditions of intermixed materials. The general proportions shown in Figs. 1 to 3 and 16 to 18 has proved efficient and satisfactory with steam coal intermixed with slate and "bone", varying considerably in size far beyond the ranges produced by the usual screening or sizing. It will be clearly understood, however, that the invention is in nowise limited by these proportions.

The separating unit just forward of this pervious hooded portion, which has just been described, has preferably solid sidewalls 26 and 27 of board, sheet metal or the like, which are connected to the bottom and general structure, as shown in Fig. 3, the sides resting upon the perforated bottom 15, which in turn rests upon the sidewalls 28 and 29 of the air chamber. The side rails or strips 30 and 31 unite this entire structure together, as shown in Fig. 3, these rails also serving to support the unit upon its vibrating frame as shown in Fig. 5 and later described.

The supporting and structural strips 30 and 31 are preferably cut down at the sides of the hooded portion just described, so as to give free egress to the air through the whole depth of the bed of mixed materials, and as shown in Fig. 2, thin retaining strips 32 and 33 are laid upon the turned out edges of the perforate sidewalls 16 and 17 to fasten them in place against the bottom 15 and within the strips 30 and 31.

Means are also provided by the invention for effecting additional strong air pressure action at the forward end of the separating unit to insure the final separation of the last intermixture, or possible intermixture, at the juncture of faces of contact of the superior and inferior strata of the now nearly completely separated materials. In certain cases, dependent to a great degree on the nature and physical condition of the material an absolute and complete separation is impracticable. A small portion of still intermixed materals may be discharged together to be returned back into the mixed materials to pass again through the separating unit.

As embodied, the sidewalls 26 and 27 of the separating unit, at their forward end, are inclined or curved upwardly, as shown at 34 and 35 in Figs. 1 and 3, whereby the level of the tops of the walls relatively to the general level of the bed of material is gradually increased in the forward direction. In connection therewith a similar perforate hood is provided, comprising upwardly extending sdewalls 36 and 37 continuous with and forming an intermediate arched top 38. The bottom edges of the side walls are turned outwardly and rest upon the top of the parts 34 and 35 of the walls of the unit, being held thereto by retaining strips 39 and 40. The hood just described is preferably open at its rear end, that is, looking backwardly along the body of the unit.

Preferably the fluid pervious bottom of the separating unit at its forward and downward end, and in conjunction with the structure and mechanism just described, is more freely pervious to the passage of the air under pressure, and for this purpose preferably this part 42 of the bottom 15 is of coarser mesh than the rearward portion of the bottom.

In connection with the structure just described, there is preferably provided a stratum regulating and supporting member, such as a vertically extending plate 48, extending the full width within the high, forward part 34 and 35 of the sidewalls of the unit, the bottom end thereof being positioned above the bottom far enough to permit passage of the largest fragments or pieces in the bottom stratum, that is of the layer of separated heavier material. At the bottom of this plate 48 is a horizontally disposed, forwardly extending plate 49, likewise extending entirely across between the unit walls. These two plates are vertically positionable as desired, and are preferably positionable together, and for this purpose connecting side plates 50 are provided, having slots 51 therein through which project bolts 52, respectively, which likewise project through the unit sidewalls to clamp the structure in the desired position.

Means are likewise provided by the invention for regulating the height and back-pressure of the inferior stratum of the now separated heavier material, this being preferably effected by offering a predetermined or regulated, but yielding pressure against its discharge from the bottom and forward end of the unit, this means preferably operating in conjunction with the vertically positionable plates 48 and 49.

As embodied, a swinging gate 56 is hinged at its upper end on a transversely disposed cross rod 57, carried in brackets 58 and 59, which are mounted on the unit sidewalls. At its bottom end the gate 56 is provided with an outwardly extending shelf or rod or like support 60 upon which a weight or weights 61 are placed, as upon a pin 62. This construction and arrangement serves to keep the gate closed on the forward end of the inclined unit up to a certain pressure of the heavy stratum and when this pressure is exceeded, permits the gate to swing outwardly to discharge a certain amount of the heavy material, such as the slate or rock.

The manner of operation of the mechanism just described is substantially as follows:

The action of the upper and rearward part of the separating unit in connection with the preliminary stratification of the intermixed materials has already been described. The now completely or nearly completely stratified materials move forwardly and downwardly from the rear hooded part of the unit between the walls 26 and 27, and tend to pile up against the plate 48.

If in the varying conditions of stratification, any of the lighter material, such as the coal, tends at any time to sink below the level of the plate 49 (this plate being adjusted to prevent this under average conditions with the particular intermixed materials under the particular physical conditions), the strong upward and backward air pressure at this point will drive these lighter materials backwardly and upwardly in the separating unit.

It will be noted that the plate 49 and the gate 56 close the forward end of the unit against the travel and pressure of the air. The result is that the lighter material, such as the coal, is thrown energetically and sometimes violently upwardly and backwardly into the hooded portion 38, and therewith possibly some of the smaller particles of the heavier material, such as the rock. The pervious hood permits any desired force of this backward and upward air pressure to be utilized irrespective of the height of the side walls of the unit.

When this final remnant of the intermixed materials is blown upwardly into the hood, the lighter material, such as the coal, is also blown backwardly, that is, toward the left in Fig. 1, into the coal in the intermediate portion of the separator unit. The heavier material, such as the rock on the other hand, will fall backwardly toward the plate 48 and in the continuance of this process will gradually settle down into the inferior stratum of heavier material, and be discharged through the gate 56. The lighter material such as the coal, on the contrary, will be thrown backwardly and will gradually pass outwardly over the sides 26 and 27 of the unit, completely clean and separated.

It will be found in practice, especially with such materials as have already been referred to, that there is a strong tendency of the larger particles of the superior stratum, that is, the lighter material, such as the coal, to travel toward the forward end of the unit, while the smaller particles of the coal to work more quickly to the upper part of the stratum of coal, and to be discharged over the tops of the sidewalls 26 and 27 just forwardly of the hood 18, the discharging particles or pieces increasing in size gradually forwardly along the separating unit. There is thus not only a discharge of the clean coal over the tops of the sidewalls but there is also a sizing operation, considered longitudinally and forwardly of this part of the separating unit. Means for taking advantage of this feature of the invention in maintaining separate and in conveying away the sized material will be later described.

A brief description will now be given of the general structure of the entire separating mechanism, together with the vibrating mechanism, the conveying devices for the separated materials, and the air pressure means.

The air pressure chamber has the sidewalls 28 and 29, already described, and has a relatively vertically disposed rear wall 70 and a downwardly and rearwardly extending front wall 71. This chamber terminates usually together with a plurality of other units, in a header 73, having a flexible connection 74 with an air pressure supply pipe 75. This is supplied with either a continuous or intermittent air pressure from a bellows, blower, or other suitable air-pressure generator.

The separating and cleaning units either singly or in a battery or group, are supported by means of the strips 30 and 31 upon a vibratable frame, having cross reaches 76 and 77 and side reaches 78 and 79. This frame has downwardly extending pins 80 contiguous to its four corners, about which are coiled helical compression spring 81, seated respectively upon pins 82, projecting upwardly from the stationary supporting frame.

The transverse vibrating means comprises a magnet 86, mounted upon a support 87, carried by the cross reach 88 of the stationary frame. The armature piece 89 for the magnet is fixed on the cross reach 76 of the vibratable frame. Pins 90 are fixed in the stationary frame, and have screw and nut adjustments 91 to vary their length. They cooperate respectively with pins 92 in the vibratable frame to regulate the amplitude of the resilient transverse vibration.

The means for effecting the vibration longitudinally of the separating units comprises a magnet 98, mounted upon a support 99, carried on the cross reach 100 of the stationary frame. The armature piece 101 of the magnet is mounted on the cross reach 77 of the vibratable frame. Pins 102 have screw and nut adjustment 103 to regulate the amplitude of the longitudinal vibration, these pins cooperating, respectively with pins 104 mounted on the vibratable frame.

Means are provided for varying the degree of inclination of the units, and as embodied, legs 106 are pivotally connected at 107 to the side reaches 108 and 109 of the stationary frame. Near the other end of these side reaches, legs 110 have a bolt and slot connection 111 with the side reaches, which gives the necessary or desired regulation of the inclination of the units.

In Figs. 1 and 5 and 7 are shown a general form of conveying means similar to that shown in my co-pending application. Chutes 116 are shown attached to the sides of the separating units to receive the lighter material, such as the coal, discharged over the tops of the sides thereof, a belt conveyer 117 receiving the materials from the chutes and conveying it away.

For the heavier material, such as the rock, a short chute 118 is shown fixed to the supporting strips 30 and 31 for the units, which chute receives the rock discharged through gate 56. The chutes 118 discharge into chutes 119, supported on the stationary frame and on legs 120. The chutes 119 discharge onto belt conveyers 121.

Figure 12:
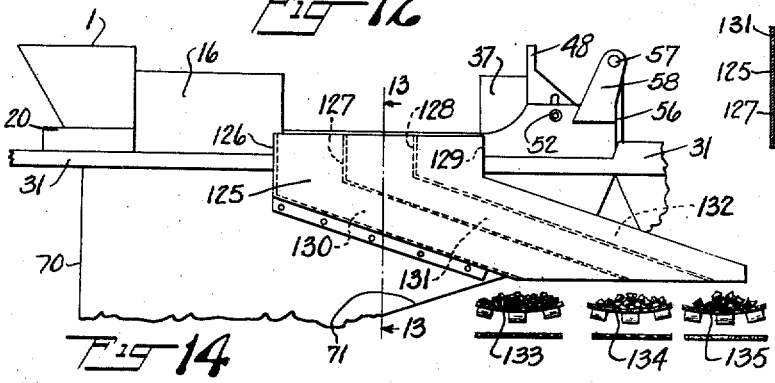
Fig. 12 is a side elevation, on a diminished scale, of a separating unit, showing a modified form of delivery chute, adapted for separating the different sizes of a separated material.
Figure 13:
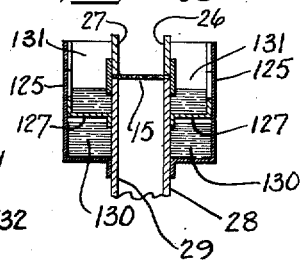
Fig. 13 is a transverse vertical section, taken substantially on the line 13—13 of Fig. 12, looking in the direction of the arrows.

Referring now to the embodied form of conveying means for maintaining separately the sized separated lighter material, such as the coal which, as previously described, is discharged sized to a greater or less degree over the tops of the sides of the separating unit, chutes are provided (Figs. 8, 12 and 13) at either side of, and extending along practically the entire discharging length of, the separating unit. This chute structure has transversely disposed, longitudinally spaced apart portions or separating walls 126, 127, 128 and 129, extending across from the outer chute wall 125 to the respective side wall of the separating unit. The compartments thus formed along each side of the unit open, respectively, into separate chutes 130, 131 and 132, extend downwardly to corresponding endless conveyers 133, 134 and 135 which convey away the sized, separated and cleaned lighter material. In case there is a relatively small remnant of still unseparated materials, such as coal and "bony" it may be discharged through chute 129 into conveyor 135 and carried back to be again subjected to the separating action.

Figure 10:
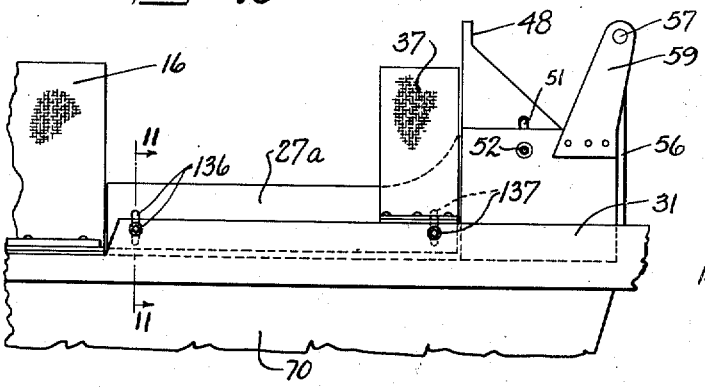
Fig. 10 is a fragmentary elevation corresponding to the upper right-hand part of Figs. 1 and 5, and showing a modified form of this part of the separating unit walls.
Figure 11:
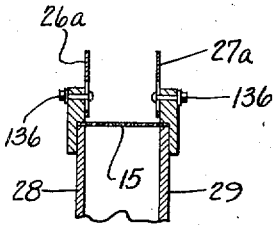
Fig. 11 is a transverse, vertical section, taken substantially on the line 11—11 of Fig. 10, looking in the direction of the arrows.

In Figs. 10 and 11 the sidewalls 26a and 27a of the separating unit are shown vertically adjustable by suitable means, such as bolt and slot connections 136 and 137, whereby the height of the sidewalls may be varied as may be desired or required with materials of different kinds, in different physical conditions or, of different sizes. Thus the thickness of the bed of material may be regulated with any desired degree of exactness and nicety.

In Fig. 9 the sidewalls 26 and 27 are shown as extending backwardly and downwardly inclined along the rear hooded portion 18, thereby modifying to a corresponding degree the action of the air pressure in the preliminary stages of the stratification. The extent and degree and location, and the form as well, of these parts of the unit sides may be varied as may be found expedient, desirable or efficient with different kinds or sizes of intermixed materials, and with such materials in different physical states or conditions.

Figure 14:
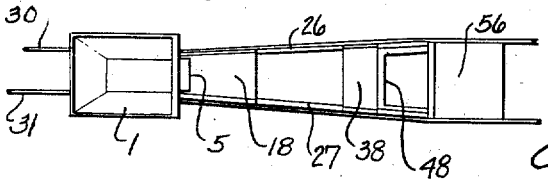
Fig. 14 is a top plan of a separating unit, on a diminished scale, showing a modified form thereof.

In Fig. 14, the separating unit is shown of varying width, and as at present advised, and in some cases and with some materials and under certain physical conditions thereof, it is advantageous to have the unit of gradually increasing width towards the forward and downward end thereof. In certain cases and with certain materials or conditions thereof the reverse may be found advisable. The efficiency and desirability of such variations in form may be readily determined by observation with particular materials and under particular conditions and availed of while realizing the chief advantages of the invention and employing its principles.

In Fig. 15 is shown diagrammatically an arrangement wherein the floating plates 140, 141 and 142 are employed, the plates 140 and 141 being adapted to float on top of the bed of materials, being preferably free to move in the vertical direction but restrained from lateral movement. Plate 142 may be pivoted at its junction with member 48. In operation, the floating plates 140 and 141, floating upon the air current or body create a back pressure, and when this pressure is exercised permit a portion thereof to escape at either side and therewith effect an outflow of lighter separated material. This construction also causes the air to travel in a current longitudinally and forwardly of the bed and regulates the air pressure to just the right degree to effect the gradual discharge of the lighter material over the edges of the unit, and prevents violent and uncontrolled action of the air through the mass of material. Any lighter material which may escape discharge and pass on beyond the plate 141, is met by a back air pressure caused by the hinged plate 142 cooperating with the member 48 to deflect forwardly moving air currents. The back air pressure so generated cooperates with the upwardly moving air pressure to force any remaining lighter material over the sides of the unit. It will be found usually, however, under ordinary conditions, that these plates will not be necessary, although they will be found helpful and increase the efficiency in certain cases.

In Figs. 16, 17 and 18 a different form of construction of the forward end of the separating unit is shown. Therein the forward end of the unit is closed by a wall 146, preferably perpendicular to the air pervious bottom 15, and inclined inwardly and backwardly from the two side walls 26 and 27 of the unit to the central part thereof as shown best in Fig. 17. This wall 146 thereby constitutes a closure for the front and lower end of the unit, sloping or inclined downwardly and outwardly from the central line or axis of the unit toward the side walls thereof.

In both of the side walls 26 and 27 immediately rearwardly of the inclined end wall 146 and at the bottom of the side walls are two discharge openings 147 and 148, which occupy only a part of the height of the respective side walls, as best appears from Figs. 16 and 18. The heavier separated material in this case is discharged through these openings 147 and 148 in the bottom parts of the forward ends of the side walls 26 and 27 of the units, the material passing downwardly and outwardly toward and through these openings, along and as directed by the inclined wall 146.

Means are provided for producing a regulable back pressure, or for effecting a yielding discharging pressure on the discharging material at the side openings 147 and 148, and thereby and therefrom a backward and upward air pressure or air blast through the bed of material. As embodied, there are provided, projecting outwardly, forwardly and downwardly from the side walls of the unit two short chutes 153 and 154, the bottoms 149 and 150 of which, in accordance with one feature of the invention, are preferably extensions of the air pervious bottom of the unit. The chutes, accordingly, are located over corresponding extensions 151 and 152 of the air pressure chamber 28 (as best appears from Figs. 17 and 18), their bottoms 149 and 150 being of wire mesh or other air pervious material. Thereby the air under pressure in the air pressure chamber 28 is also forced upwardly through the floors 149 and 150.

These discharge chutes extend outwardly a short distance, and preferably with the same direction of inclination as the wall 146. The chute 153 has side walls 155 and 156, the wall 156 being conveniently a continuation of the end wall 146 of the unit. At its front end, chute 153 has a transversely disposed, upwardly extending curb or lip 157 extending across the chute from one side wall to the other.

The construction of the other chute 154 is the same or similar, this chute having side walls 159 and 160, and the end curb or lip 161, similar or the same in construction as those on the other side of the unit.

The further and additional structure for causing the regulable back air pressure or air current in this embodied form comprises loose or floating plates 163 and 164, respectively, which fit loosely within the chutes 153 and 154, as best appears from Fig. 18. Suitable guiding means are provided therefor, and as embodied the plates 163 and 164 are preferably centrally apertured, and guiding pins 166 and 167, respectively, are fixed at their ends in the bottoms of the chutes and in enclosing top plates or covers 168 and 169, respectively. These covers connect with the top edges of the chute side walls and of the side walls of the unit as will be clear from Figs. 17 and 18 but leave an open discharging space at the forward end of the respective chutes above the curbs or lips 157 and 161.

The loose or floating closures or plates 163 and 164 when they sink to the level of the lips or curbs 157 and 161 practically close the discharge orifices 147 and 148, and when they rise above the top edge of these lips or curbs 157 and 161 they leave these discharge orifices free for the discharge of the rock or other heavier material.

The two chutes 153 and 154 discharge, respectively, into conveying chutes 174 and 175, which may conveniently empty into the chute 118 or into any other suitable or convenient device or means for receiving the discharged rock or other heavier material. This chute structure shown at each side in Fig. 17 may be generally similar to that shown in Fig. 12, and already described.

In Fig. 19 a slightly modified form is shown wherein the pervious hood 38 is provided at the forward end of the unit, and the arrangement is substantially the same as shown in Fig. 7.

The manner of operation of the mechanism just described will be generally understood from what has already been stated. In the modified form of Figs. 16 to 19, the heavier material, through the action of the stratifying and separating process, settles at the forward and bottom end of the unit, and tends to pass outwardly through the discharge openings 147 and 148. However, owing to the curbs 157 and 161, the free outward flow of this heavier material is impeded, and the floating plates 163 and 164 practically close the chutes. Consequently a strong upward and backward air pressure and air current is produced, which will drive upwardly and backwardly any pieces of particles of the lighter material which may have progressed downwardly to this point, the particles moving upwardly and backwardly in the general manner already described, and finally being discharged over the side walls 26 and 27 of the unit. Should any of the smaller particles of the heavier material be carried or blown backwardly therewith, these will fall again near the end wall 146 and will gradually work down towards the discharge openings 147 and 148.

As the heavier material collects and the layer or stratum increases, the air pressure will force the plates 163 and 164 upwardly past the curbs 157 and 161, and the rock will be discharged into the chutes 174 and 175. As the pressure decreases, and the amount of heavy material becomes less, the plates 163 and 164 will again drop downwardly and will again close the openings at the curbs or lips 157 and 161. Thus the desired backward air pressure and separating air current are effected and maintained while the mechanism automatically operates to discharge the accretions of rock or other heavier material and then returns to its former position or condition.

From all the foregoing, it will be understood that a mechanism and process has been provided realizing the objects and advantages herein set forth, together with other objects and advantages; and also that departures may be made from the exact structure and steps or procedure shown and described without departing from the principles of the invention and without sacrificing its chief advantages.

What I claim is:

1. A mechanism for separating intermixed divided materials including in combination means for maintaining a bed of the materials, means for subjecting the rearward portion of the bed to the action of air pressure currents in a plurality of directions and for subjecting a more forwardly part of the bed only to air pressure currents upwardly therethrough to progressively stratify and separate the materials and means for continuously discharging the separated materials at different points by the action of the air and the motion of the table.

2. A mechanism for separating intermixed divided materials including in combination means for maintaining a bed of the materials of substantial depth in which the materials move along the bed in the same general direction, means for subjecting the rearward portion of the bed to the action of air pressure currents in a plurality of directions and for subjecting an intermediate part of the bed to air pressure currents only upwardly therethrough and for subjecting the forward portion of the bed to air pressure currents in a plurality of directions including backwardly, and means for continuously discharging the separated materials at different points by the action of the air and the motion of the table.

3. A mechanism for separating intermixed divided materials including in combination means for maintaining a bed of the materials in which the light and heavy materials flow in the same direction, means for subjecting the materials to the action of air pressure currents, means located at the rearward and at the forward portion of the bed for maintaining the materials on the bed against the displacing action of the air currents and means for concurrently and continuously discharging the lighter and heavier materials from different parts of the table.

4. A mechanism for separating intermixed divided materials including in combination means for maintaining a relatively long, narrow and deep bed of the materials in which the light and heavy materials flow in the same direction and progressively stratify, means for subjecting the rearward portion of the bed to the action of air pressure currents in a plurality of directions and for subjecting an intermediate part of the bed to air pressure currents only upwardly therethrough and for subjecting the forward portion of the bed to air pressure currents in a plurality of directions including backwardly, and means for continuously discharging the separated materials at different points by the action of the air and the motion of the table.

5. A mechanism for separating intermixed divided materials including in combination means for maintaining a bed of the materials, means for subjecting the rearward portion of the bed to the action of air pressure currents in a plurality of directions and for subjecting an intermediate part of the bed to air pressure currents only upwardly therethrough and for subjecting the forward portion of the bed to air pressure currents in a plurality of directions, and means for concurrently vibrating the bed both longitudinally and vertically.

6. A mechanism for separating intermixed divided materials including in combination means for maintaining a bed of the materials in which the light and heavy materials flow in the same direction, means for subjecting the rearward portion of the bed to the action of air pressure currents in a plurality of directions and for subjecting a more forwardly part of the bed only to air pressure currents upwardly therethrough to stratify and separate the materials, and means for discharging the separated heavier material from the bottom and forward end of the bed.

7. A mechanism for separating intermixed divided materials including in combination means for maintaining a bed of the materials in which the light and heavy materials flow in the same direction, means for subjecting the materials to the action of air pressure currents, means located at the rearward portion of the bed for maintaining the materials in the rear of the bed against the displacing action of the air currents, and means for substantially continuously discharging the separated heavier material from the bottom and forward end of the bed, and means for laterally discharging the separated lighter material from the top of the bed.

8. A mechanism for separating intermixed divided materials including in combination means for progressively stratifying and separating the intermixed materials including means for maintaining a bed of the materials having an air pervious bottom and sides partly air pervious and partly air impervious, and means for forcing air under pressure through the pervious bottom.

9. A mechanism for separating intermixed divided materials including in combination means for progressively stratifying and separating the intermixed materials including means for maintaining a bed of the materials having an air pervious bottom and sides partly air pervious and partly air impervious lengthwise thereof, means for transversely discharging the separated lighter material from the top stratum, and means for forcing air under pressure through the pervious bottom.

10. A mechanism for separating intermixed divided materials including in combination means for stratifying and separating the intermixed materials including means for maintaining a bed of the materials having an air pervious bottom and sides partly air pervious and partly air impervious, means for forcing air under pressure through the pervious bottom, and a hood restraining the material from being thrown clear of the bed by the air current.

11. A process for separating intermixed divided materials, comprising subjecting a downwardly inclined bed of intermixed materials to currents of air flowing upwardly therethrough and to vibration, for causing the materials to move along together in the same general direction and to stratify progressively, and screening a given area at the top of the bed for allowing the escape of the air and for preventing the escape of solid materials, the ultimate separation being effected by a spilling over of the lighter material from the top stratum.

12. A process for separating intermixed divided materials comprising maintaining a continuous bed of intermixed materials of substantial depth upon and progressing it along an air-pervious table, having a substantially continuous surface, gradually and progressively stratifying and separating the intermixed materials of the bed according to their specific gravities by vibrating the table and by forcing air through the bed, discharging the lighter and heavier separated materials from the bed at different places and imposing mechanical resistance and rearwardly directed air currents at the place of discharge of the heavier material to regulate said discharge.

13. The method of discharging a settled heavier material from a stratified bed of materials of different specific gravities which comprises vibrating the bed to intermittently advance the settled heavier material and regulating the discharge thereof by air and regulable mechanical pressure.

14. An apparatus for discharging a settled heavier material from a stratified bed of materials of different specific gravities including in combination a discharge orifice, means for progressing a stream of settled heavier material to the orifice, means for varying the size of the orifice and a yielding member for normally closing the orifice.

15. An apparatus for discharging a settled heavier material from a stratified bed of materials of different specific gravities including in combination a discharge orifice, means for progressing a stream of settled heavier material to the orifice by intermittent advancing movement, means for varying the size of the orifice and a swinging closing member at the orifice adapted to swing open under impact of the advancing material to discharge the material.

16. An apparatus for discharging a settled heavier material from a stratified bed of materials of different specific gravities including in combination a discharge orifice, means for progressing a stream of settled heavier material to the orifice by intermittent advancing movements, means for directing air currents through the stream of materials counter to the direction of advance to prevent remixing of lighter material, and a closing member at the orifice adapted to open under impact of the advancing material to discharge the material.

17. An apparatus for discharging a settled heavier material from a stratified bed of materials of different specific gravities including in combination a channel for the passage of the inferior heavier material, a variably positionable member for varying the height of the channel, and a swinging gate at the end of the channel for regulating the discharge of material therefrom.

18. The process of separating intermixed divided materials which comprises stratifying a bed of said materials by air currents and vibration, progressing a stream of settled heavier material through a discharge orifice, progressing a flotant, superposed stratum of lighter material above the orifice to discharge in a different direction, and controlling the entry of material into the orifice by directing a current of air through the orifice counter to the entering stream of heavier material and by varying the vertical extent of the orifice to hold back the superposed stratum of lighter material.

19. A mechanism for separating intermixed divided materials including in combination a vibratable, air-pervious table, means for maintaining thereon a bed of intermixed materials of substantial depth, means for stratifying the materials in superposed strata according to their specific gravities, means for progressing a settled stream of heavier material along the table surface to discharge, means for flowing the superior stratum of lighter material transversely above the settled heavier material, and means for controlling the discharge of the stream of heavy material comprising an orifice extending upwardly from the table surface and limited in its vertical and lateral dimensions, means for varying the height of the orifice to hold back the superposed lighter material and permit only the stratum of heavy material to pass therethrough, and means for passing a current of air through the orifice to oppose entry of lighter material and control the passage of the heavy material.

20. A mechanism for separating intermixed divided materials including in combination a reciprocable, air-pervious table, means for maintaining and stratifying thereon a bed of said materials, means for progressing a settled stream of heavier material along the table to discharge, means for progressing a flotant stratum of lighter material transversely above the settled stream to discharge, a discharge orifice for the settled stream of heavy material and means for controlling passage of the heavier material through the orifice comprising a freely suspended closure adapted to oscillate by its own inertia during reciprocation of the table, and variable positionable means for controlling the depth of the orifice.

21. The method of discharging a settled heavier material from a forwardly and downwardly inclined, stratified bed of materials of different specific gravities which comprises vibrating the bed to intermittently advance the settled heavier material longitudinally of and to the forward end of the bed, and regulating the discharge thereof from the forward end of the bed by air and regulable mechanical pressure, the mechanical pressure opposing said discharge and being intermittently exceeded by pressure resulting from the accumulation of the heavier material to be discharged.

22. The method of discharging a settled heavier material from a forwardly and downwardly inclined stratified bed of materials of different specific gravities which comprises vibrating the stratified bed to intermittently advance a settled heavier material to the bottom and forward end of the bed, arresting the forward flow of a part of the forward end of said bed adjacent the lower portion of a superior stratum of lighter material and the upper portion of an inferior stratum of heavier material, permitting flow of the heavier settled material forwardly below said barrier, and regulating the discharge thereof by air and regulable mechanical pressure, the mechanical pressure opposing said discharge and being intermittently exceeded by pressure resulting from accumulation of the heavier material to be discharged.

23. The method of discharging a settled heavier material from a forwardly and downwardly inclined, stratified bed of materials of different specific gravities which comprises vibrating the bed to intermittently advance the settled heavier material longitudinally of and to the forward end of the bed, and regulating the discharge thereof from the forward end of the bed by air and regulable mechanical pressure, including the steps of opposing the discharge of settled heavy material by said mechanical pressure to build up an accumulation of heavy material at the forward end of the bed until the combined pressures of the accumulated heavy material and air pressure existing in the bed overcome said mechanical pressure and release settled heavy material from the bed.

24. The method of discharging a settled heavier material from a forwardly and downwardly inclined, stratified bed of materials of different specific gravities which comprises vibrating the bed to intermittently advance the settled heavier material longitudinally of and to the forward end of the bed, and regulating the discharge thereof from the forward end of the bed by air and regulable mechanical pressure, including the steps of interposing a barrier between the upper part of the stratum of settled heavy material and the lower part of the stratum of flotant lighter material, permitting flow of settled heavy material forwardly below said barrier and opposing discharge thereof by said mechanical pressure to build up an accumulation of heavy material at the forward end of the bed and back into the bed behind the barrier until the pressure caused by the accumulation of said heavy material overcomes the mechanical pressure to release settled heavy material from the bed.

KENNETH DAVIS.